(12) United States Patent
Weber et al.

(10) Patent No.: US 11,928,119 B2
(45) Date of Patent: *Mar. 12, 2024

(54) MINING EMAIL INBOXES FOR SUGGESTING ACTIONS

(71) Applicant: YAHOO ASSETS LLC, Dulles, VA (US)

(72) Inventors: Ingmar Weber, Barcelona (ES); Yoelle Maarek, Haifa (IL); Yehuda Arie Koren, Zichron Yaakov (IL)

(73) Assignee: YAHOO ASSETS LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/849,811

(22) Filed: Jun. 27, 2022

(65) Prior Publication Data
US 2022/0327121 A1    Oct. 13, 2022

Related U.S. Application Data

(63) Continuation of application No. 17/223,233, filed on Apr. 6, 2021, now Pat. No. 11,372,870, which is a continuation of application No. 16/451,478, filed on Jun. 25, 2019, now Pat. No. 10,977,261, which is a continuation of application No. 13/105,819, filed on May 11, 2011, now Pat. No. 10,366,341.

(51) Int. Cl.
*G06N 20/00* (2019.01)
*G06F 16/2458* (2019.01)
*G06Q 10/107* (2023.01)

(52) U.S. Cl.
CPC ........ *G06F 16/2465* (2019.01); *G06N 20/00* (2019.01); *G06Q 10/107* (2013.01)

(58) Field of Classification Search
CPC ... G06F 16/2465; G06Q 10/107; G06N 20/00
See application file for complete search history.

(56) References Cited

U.S. PATENT DOCUMENTS 5,799,148 A    8/1998   Cuddihy et al.
6,026,397 A    2/2000   Sheppard
(Continued)

OTHER PUBLICATIONS

"OtherInbox: Save your inbox for real people," OtherInbox, Inc., 3 pages http://www.otherinbox.com, accessed Dec. 16, 2010.
(Continued)

*Primary Examiner* — Tonia L Dollinger
*Assistant Examiner* — Joseph M Cousins
(74) *Attorney, Agent, or Firm* — James J. DeCarlo; Greenberg Traurig, LLP

(57) ABSTRACT

Embodiments are directed towards automatically learning user behavioral patterns when interacting with messages and based on the learned patterns, suggesting one or more predicted actions that a user might take in response to receiving subsequent message. One or more classifiers are trained and employed to predict one or more actions that a user might take in response to receiving the message. In one embodiment, the one or more predicted actions are provided suggested to the user as an action the user might take on the message. Messages may be rank ordered within a given suggested action based on a confidence level of the prediction.

16 Claims, 5 Drawing Sheets

(56) References Cited

U.S. PATENT DOCUMENTS

| | | | |
|---|---|---|---|
| 6,636,836 B1 | 10/2003 | Pyo | |
| 6,701,346 B1 | 3/2004 | Klein | |
| 6,778,941 B1 | 8/2004 | Worrell et al. | |
| 7,089,241 B1 | 8/2006 | Alspector et al. | |
| 7,693,945 B1 | 4/2010 | Dulitz et al. | |
| 8,402,387 B1 | 3/2013 | Iversen | |
| 8,423,577 B1 | 4/2013 | Lee et al. | |
| 9,098,459 B2 | 8/2015 | Davis et al. | |
| 10,769,677 B1* | 9/2020 | Agrawal | G06F 16/9535 |
| 2003/0046421 A1 | 3/2003 | Horvitz et al. | |
| 2006/0031329 A1 | 2/2006 | Robertson | |
| 2007/0094217 A1 | 4/2007 | Ronnewinkel | |
| 2007/0143428 A1 | 6/2007 | Kumar et al. | |
| 2007/0282675 A1 | 12/2007 | Varghese | |
| 2008/0126310 A1 | 5/2008 | Xu | |
| 2008/0162651 A1 | 7/2008 | Madnani | |
| 2009/0037469 A1 | 2/2009 | Kirsch | |
| 2009/0100351 A1 | 4/2009 | Bromenshenkel et al. | |
| 2009/0210475 A1 | 4/2009 | Gadanho et al. | |
| 2009/0228439 A1 | 9/2009 | Manolescu et al. | |
| 2009/0287814 A1 | 11/2009 | Robertson et al. | |
| 2010/0082751 A1 | 4/2010 | Meijer et al. | |
| 2010/0153325 A1 | 6/2010 | Amoroso et al. | |
| 2010/0169264 A1* | 7/2010 | O'Sullivan | G06Q 10/10 709/206 |
| 2010/0205259 A1 | 8/2010 | Vitaldevara et al. | |
| 2010/0263045 A1 | 10/2010 | Dulitz et al. | |
| 2011/0055000 A1* | 3/2011 | Zhang | G06Q 30/0244 705/14.43 |
| 2011/0098999 A1 | 4/2011 | Amini et al. | |
| 2012/0005291 A1* | 1/2012 | True | H04L 63/1408 709/206 |
| 2012/0042024 A1 | 2/2012 | Kirshenboim | |
| 2012/0143798 A1 | 6/2012 | Sundelin et al. | |
| 2012/0209713 A1 | 8/2012 | Plut | |
| 2012/0233083 A1 | 9/2012 | Strodtman et al. | |
| 2012/0246098 A1 | 9/2012 | Chari et al. | |
| 2013/0041912 A1 | 2/2013 | Arora et al. | |
| 2013/0159326 A1 | 6/2013 | Kyomasu et al. | |
| 2015/0324849 A1* | 11/2015 | Datar | G06Q 10/107 705/14.55 |

OTHER PUBLICATIONS

"Hotmail: Organize your inbox," Microsoft Corporation, 1 page http://explore.live.com/windows-live-hotmail-organize-inbox, accessed Jan. 7, 2011.

"Hotmail: View and filter your messages quickly," Microsoft Corporation, 1 page http://explore.live.com/windows-live-hotmail-view-filter-messages-using, accessed Jan. 7, 2011.

"Xiant Filer FAQs" Xiant, 4 pages http://xiant.com/TemplateMain.aspx?contentid=12, accessed Jan. 7, 2011.

"Xiant Filer Features" Xiant, 4 pages http://xiant.com/TemplateMain.aspx?contentid=19, accessed Jan. 7, 2011.

"Xiant Filer" Xiant, 2 pages http://xiant.com/TemplateMain.aspx?contentid=10, accessed Jan. 7, 2011.

T. Karagiannis and M. Vojnovic, "Behavioral Profiles for Advanced Email Features," www 2009 Madridi, Track: Social Networks and Web 2.0/Session: Diffusion and Search in Social Networks, Apr. 20-24, 2009, Madrid, Spain, pp. 711-720.

* cited by examiner

MINING EMAIL INBOXES FOR SUGGESTING ACTIONS

CROSS REFERENCE TO RELATED APPLICATIONS

This application is a continuation of, and claims priority from, U.S. patent application Ser. No. 17/223,233, filed Apr. 6, 2021, issued as U.S. Pat. No. 11,372,870 on Jun. 28, 2022, and entitled MINING EMAIL INBOXES FOR SUGGESTING ACTIONS, which is a continuation of, and claims priority from, U.S. patent application Ser. No. 16/451,478, filed Jun. 25, 2019, issued as U.S. Pat. No. 10,977,261 on Apr. 13, 2021, and entitled MINING EMAIL INBOXES FOR SUGGESTING ACTIONS, which is a continuation of, and claims priority from, U.S. patent application Ser. No. 13/105,819, filed May 11, 2011, issued as U.S. Pat. No. 10,366,341 on Jul. 30, 2019, and entitled MINING EMAIL INBOXES FOR SUGGESTING ACTIONS, the contents of each of which are hereby incorporated by reference.

TECHNICAL FIELD

The present invention relates generally to managing messages, such as email messages, and, more particularly, but not exclusively to automatically learning user behavioral patterns when interacting with messages and suggesting one or more actions that a user might take in response to receiving a subsequent message. In one embodiment, received messages are rank ordered for a suggested action.

BACKGROUND

Email messages are a central means of communication between users over the Internet, partly because a user can maintain the messages over an extended period of time. Therefore, many email applications devote a significant part of their real estate on a computer display screen to offer users with various organizational mechanisms. For example, today, some messaging applications allow users to create and use folders, labels, or other various organizational tools. Yet, as of today in spite of numerous efforts, many people still find it tedious and/or complicated to use many of the organizational mechanisms provided to them. Moreover, even after such organizational mechanisms are applied, it may remain difficult for people to determine what to do with the messages. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
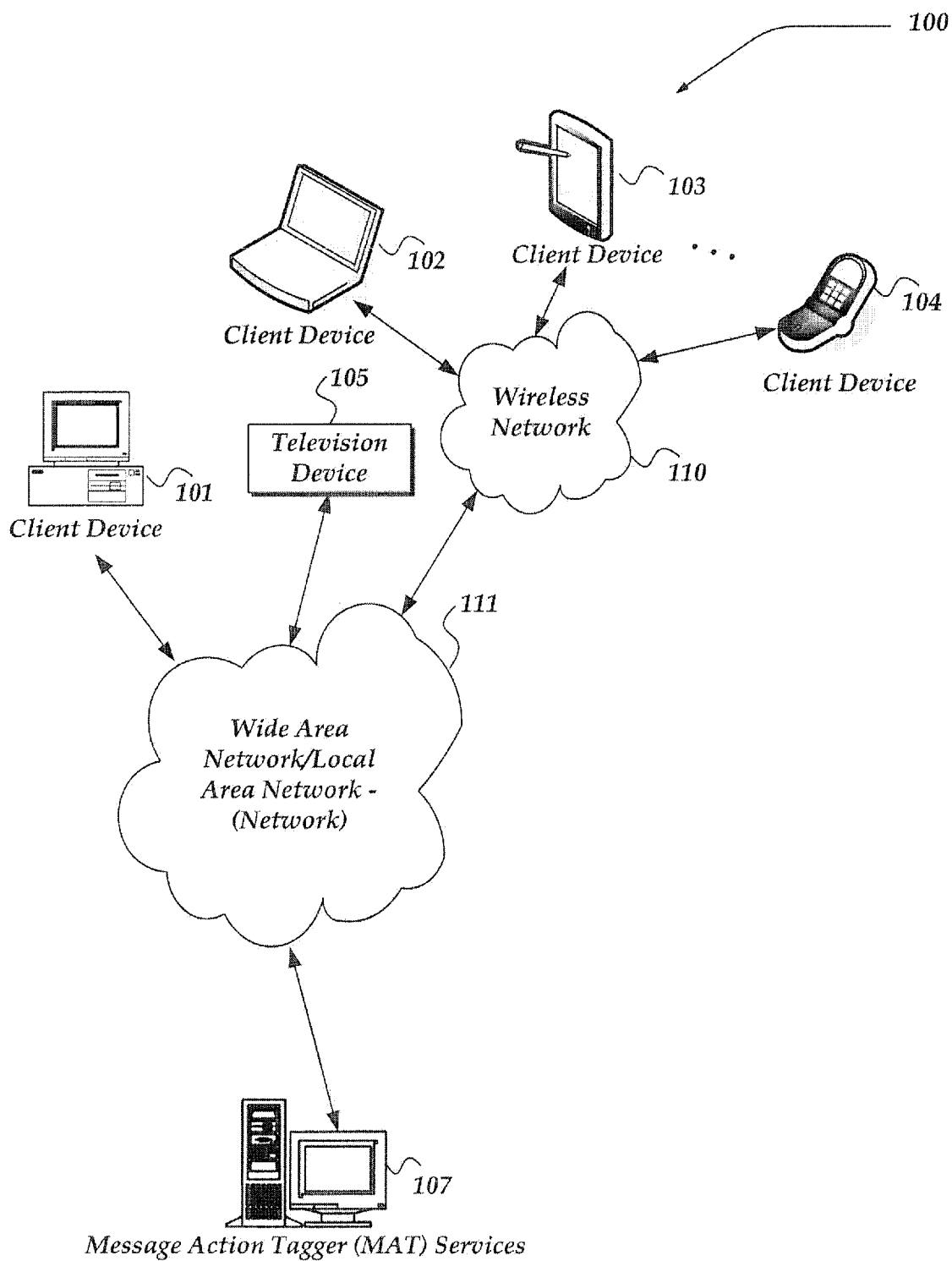
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "feature" refers to any part of a message, including header information and attachments, as well as events associated with the message. Several features are described in more detail below. Briefly, however, in one embodiment, some features may be considered as being specific to a recipient, a sender, or even a combination of sender-recipient. Features may also be associated with a characteristic of a message. Non-limiting, non-exhaustive examples of recipient features include, activity levels for the recipient; a login frequency that might indicate, for example, how many logins a user has done on their messaging client during a given time period, such as a day, week, month, or the like; a number of messages received during a given time period; a number or fraction of messages replied to, forwarded, read, discarded, archived, such as to a special folder; annotated the message for a later action; even taking no action on a message may be included as a feature. Non-limiting, non-exhaustive examples of sender features might include counts for tokens, phrases, symbols, or the like, within a "from" or "subject" such as "reminder," "foursquare," "facebook mail," or the like; information indicating that the message is processed "from" filed to, detect a gender of the sender; message domain of the sender;

tokens from the message address, such as "no-reply," or the like. Examples of sender-recipient pair features might include, same last name in the "from" and "to" fields; amount of overlap in message addresses; historic information of the messages exchanged, read, replied to; average reply times; average reply ratios; and the like. Examples of message (characteristic) features may include tokens/words in a subject; tokens/words in a body; time of day a message is sent; time of day the message is read or otherwise acted upon; number, types, size, and names of attachments; number and targets of Uniform Resource Locators (URLs) or the like within a message; message length; key words in the message; number of other recipients in a "To," or "CC" header; and the like. Other features in addition to or in place of those listed above may also be used to generate a feature vector for each message.

As used herein, the term "mining" includes searching, examining, extracting information from, and/or otherwise monitoring, a collection of messages and actions. Mining may then be employed to generate one or more predictions about how a user might respond to a given message.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the present invention is directed towards automatically learning user behavioral patterns when interacting with messages and based on the learned patterns, suggesting one or more actions that a user might take in response to receiving a subsequent message. In one embodiment, a plurality of features, are extracted from a plurality of messages, as well as from events or actions associated with the messages, to generate a plurality of feature vectors. Various classifiers are then trained, including horizontal classifiers and vertical classifiers, using the feature vectors. Briefly, a horizontal classifier may include virtually any classifier that is trained across a plurality of users' inboxes, and actions upon the messages to determine a "wisdom of the crowds," suggested action. Vertical classifiers may include virtually any classifier that is trained on a single user's inbox and actions upon messages. In one embodiment, multiple vertical classifiers may be employed, including a vertical general classifier that is trained based on a particular user, and another vertical pair-wise classifier that is trained based on a particular recipient (user)-sender pair relationship for messages. In one embodiment, the classifiers may be binary classifiers that are configured to take a feature vector of an incoming message and to output a binary decision, such as a yes/no, for a given action. Other classifiers may also be employed, including a time regression classifier that provides, for example, a response to what is an expected time until a certain action will be taken, or a similar output.

Then, for each new incoming message, a feature vector may be generated and one or more of the above classifiers are employed to produce a set of one or more predicted actions that a user might take on the incoming message. In one embodiment, the results of the one or more classifiers may be combined to provide a weighted suggested action. In one embodiment, the classifiers may further provide a confidence value indicating a level of confidence in the output predicted action to be taken. The confidence value may then be employed, in one embodiment, to rank order messages within a given predicted action. In still another embodiment, actions might be rank ordered based on a variety of metrics, including, but not limited to a quantity of messages, a collective confidence value for the messages with each action, or the like. The messages may then be displayed within a messaging client to the user, along with the predicted actions, where the predicted actions may be considered as actions suggested to the user to take on a given message. In one embodiment, more than one action may be suggested to be taken for a message. In one embodiment, the multiple actions for a message may be logically arranged, such as "read," then, "reply." However, other ordering criteria may also be employed. In one embodiment, the displayed suggested actions may include a selectable icon that when selected by the user initiates the suggested action.

Providing explicit suggested actions to be performed on a message is directed in part to providing actions that are intended to be of a similar nature as actions that are actually observed, either globally over a plurality of users, and/or for a particular user. Such suggested actions may also enable improved social interactions, as it may encourage and assist users in focusing their attention on more relevant social relationships. Further, providing suggested actions is directed also to providing a more informative mechanism of guidance to the user over other mechanisms that, for example, merely indicate whether a message is important or not. In addition, providing predicted actions as suggested actions that a user might take on a message are also directed towards enabling conversations to be preserved between the user and others.

It should also be recognized that while the disclosure is described in terms of email messages, embodiments are not so limited. Thus, in other embodiments, other types of messages for which a user may maintain over a period of time may also be classified using suggested actions. Moreover, it should be recognized that other types of content may also employ the embodiments, including, without limit to organizing, music content, video content, audio content, documents, or the like, based in part on a suggested action to be taken by a user.

It should also be recognized that while messages are disclosed herein, other applications may also employ the various embodiments, to enhance sharing of advertisements, and/or other items, usable to monetize a suggested action. For example, in one embodiment, based on predictions of how a particular user might respond to a given advertisement, one or more advertisements might be sent to the particular user. In this manner, for example, a user that is predicted to respond to particular advertisements might be provided those advertisements. Similarly, if a given user is predicted to more likely to forward particular advertisements, those advertisements might be directed to those users. In this way, directed and focused advertisements may be provided.

Illustrative Operating Environment

FIG. 1 shows components of one embodiment of an environment in which the invention may be practiced. Not all the components may be required to practice various embodiments, and variations in the arrangement and type of the components may be made. As shown, system 100 of FIG. 1 includes local area networks ("LANs")/wide area networks ("WANs")-(network) 111, wireless network 110, client devices 101-105, and Message Action Tagger (MAT) 107.

One embodiment of client devices 101-105 is described in more detail below in conjunction with FIG. 2. Generally, however, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 102-104 typically range widely in terms of capabilities and features. For example, a cell phone may have a numeric keypad and a few lines of monochrome Liquid Crystal Display (LCD) on which only text may be displayed. In another example, a web enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, multiprocessor systems, microprocessor-based or programmable consumer electronics, network Personal Computers (PCs), or the like. In one embodiment at least some of client devices 102-104 may operate over wired and/or wireless network. Client device 105 may include virtually any device useable as a television device. Today, many of these devices include a capability to access and/or otherwise communicate over a network such as network 111 and/or even wireless network 110. Moreover, client device 105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like, to display and send a message. In one embodiment, a user of the client device may employ the browser application to perform various actions over a network (online). For example, the user of the client device may select to access and manage a user message account, send messages, organize messages, create user folders or the like. However, another application may also be used to perform various online actions.

For example, client devices 101-105 also may include at least one other client application that is configured to access and/or manage user message accounts, between another computing device. The client application may include a capability to provide and receive textual content, graphical content, audio content, and the like. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent between other client devices, MAT Services 107, or other computing devices.

Client devices 101-105 may further be configured to include a client application that enables an end-user to log into a user message account that may be managed by another computing device, such as MAT Services 107 or the like. Such user message account, for example, may be configured to enable the user to manage one or more online actions, including for example, compose messages, delete messages, replay to messages, forward messages, archive messages, create folders, move messages to folders, or the like.

Wireless network 110 is configured to couple client devices 102-104 and its components with network 111. Wireless network 110 may include any of a variety of wireless sub-networks that may further overlay stand-alone ad-hoc networks, and the like, to provide an infrastructure-oriented connection for client devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, and the like. Access technologies such as 2G, 3G, 4G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client devices 102-104 and another computing device, network, and the like.

Network 111 is configured to couple network devices with other computing devices, including, MAT Services 107, client devices 101 and 105, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, computer-readable devices described in more detail below.

MAT Services 107 may include virtually any network device usable to operate as a messaging service to provide messages and suggested actions for the messages to client devices 101-105. Such messages may include, but is not limited to email, instant messages, and the like. One embodiment of MAT Services 107 is described in more detail below in conjunction with FIG. 3, Briefly, however, MAT Services 107 represents one or more network devices that may monitor a plurality of user actions upon a set of messages to automatically learn user behavioral patterns when interacting with messages. In one embodiment, one or more machine learning classifiers may be trained on the set of messages to learn the users' behavioral patterns. Then, based on the learned patterns, MAT Services 107 may suggest one or more actions that a user might take in response to receiving subsequent messages. MAT Services 107 may provide a display of the suggested actions within a messaging client to enable a user to interact and select the one or more suggested actions. MAT Services 107 may further monitor subsequent actions actually taken by the users to revise and/or retrain its classifiers. MAT Services 107 may employ a process such as that which is described below in conjunction with FIG. 4 to perform at least some of its actions. Further, in one embodiment, MAT Services 107 may provide a display to a user, such as described further below in conjunction with FIG. 5.

Devices that may operate as MAT Services 107 include various network devices, including, but not limited to personal computers, desktop computers, multiprocessor systems, microprocessor-based or programmable consumer electronics, network PCs, server devices, network appliances, and the like. It should be noted that while MAT Services 107 is illustrated as a single network device, the invention is not so limited. Thus, in another embodiment, MAT Services 107 may represent a plurality of network devices. For example, in one embodiment, MAT Services 107 may be implemented using a cloud architecture, being distributed over a plurality of network devices.

Moreover, MAT Services 107 is not limited to a particular configuration, Thus, MAT Services 107 may operate using a master/slave approach over a plurality of network devices, within a cluster architecture, a peer-to-peer architecture, and/or any of a variety of other architectures. Thus, MAT Services 107 is not to be construed as being limited to a single environment, and other configurations, and architectures are also envisaged.

Illustrative Client Device

Figure 2:
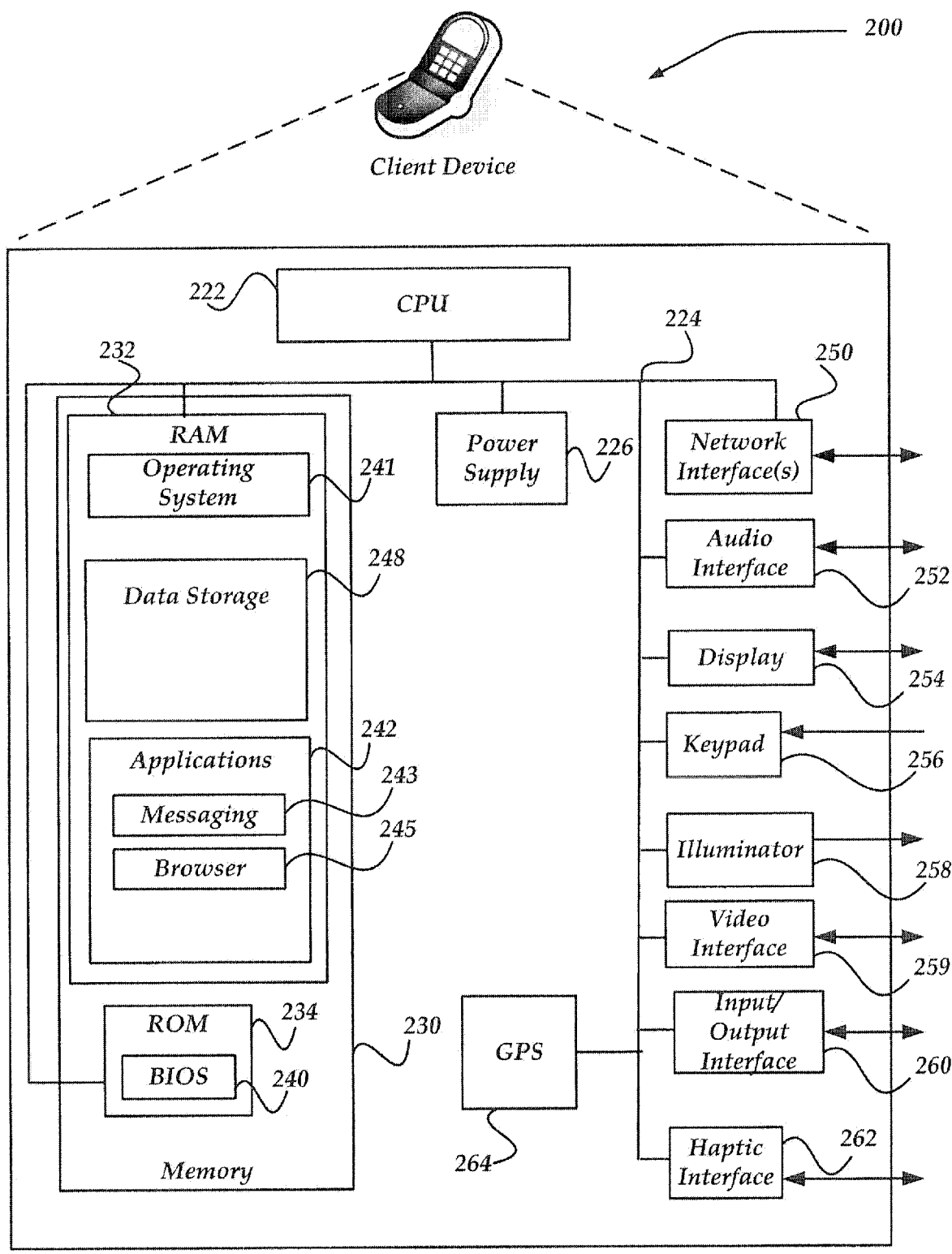
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-105 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery. In one embodiment, although not shown, a gyroscope may be employed in client device 200 to measure and/or maintain an orientation of client device 200, and/or an orientation of a displayed image.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), Short Message Service (SMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In one embodiment, video interface 259 is configured to enable any of a variety of input/outputs for video digital data over a network.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200 on the surface of the Earth. It is understood that under different conditions, UPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a Media Access Control (MAC) address, IP address, or the like.

Mass memory 230 includes a Random Access Memory (RAM) 232, a Read-Only Memory (ROM) 234, and other storage means. Mass memory 230 illustrates an example of computer readable storage media (devices) for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200. The information may then be provided to another device based on any of a variety of events, including being sent as part of a header during a communication, sent upon request, or the like. Data storage 248 may also be employed to store folders, address books, buddy lists, aliases, user profile information, multimedia content, or the like. Data storage 248 may also be configured to store messages, message folders, information about suggested actions, and/or other information related to managing of messages. Further, as illustrated, data storage 248 may also store web page content, or any of a variety of user generated content. In one embodiment, a user may download, and/or otherwise access for storage in data storage 248 one or more folders useable for organizing messages. At least a portion of the information may also be stored on a disk drive or other computer-readable storage device (not shown) within client device 200.

Applications 242 may include computer executable instructions which, when executed by client device 200, transmit, receive, and/or otherwise process messages (e.g., SMS, Multimedia Message Service (MMS), Instant Message (IM), email, and/or other messages), audio, video, and enable telecommunication with another user of another client device. Other examples of application programs include calendars, search programs, email clients, IM applications, SMS applications, Voice Over Internet Protocol (VOID) applications, contact managers, task managers, transcoders, database programs, word processing programs, security applications, spreadsheet programs, games, search programs, and so forth. Applications 242 may include, for example, messaging 243 and browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may be employed. In one embodiment, browser 245 may enable a user of client device 200 to access/or otherwise manage a user message account, such as Yahoo! Mail, Hotmail, Gmail, or the like.

Messaging 243 may be configured to manage a user message account using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messaging 243 may be configured as a mail user agent (MUA) such as Elm, Pine, Message Handling (MH), Outlook, Eudora, Mac Mail, Mozilla Thunderbird, or the like. In another embodiment, messaging 243 may be a client application that is configured to integrate and employ a variety of messaging protocols, including, but not limited to various push and/or pull mechanisms for client device 200. In one embodiment, messaging 243 may interact with browser 245 for managing messages. As used herein, the term "message" refers to any of a variety of messaging formats, or communications forms, including but not limited to email, SMS, IM, MMS, IRC, or the like. A user may employ messaging 243 to access one or more messages and perform various actions upon the messages, including, but not limited to moving the messages from one folder to another folder; deleting a message; forwarding a message, responding to a message; tagging, labeling, or otherwise providing an identifier to a message. In one embodiment, the identifier may then be employed to sort and/or otherwise organize the messages. In one embodiment, the identifier might be associated with a suggested action that a user might take upon a message, the suggested action being automatically generated without additional user actions upon the message with which the suggested action is associated. Such suggested actions may be generated by one or more remote applications, or by one or more applications that might reside within client device 200.

Illustrative Network Device

Figure 3:
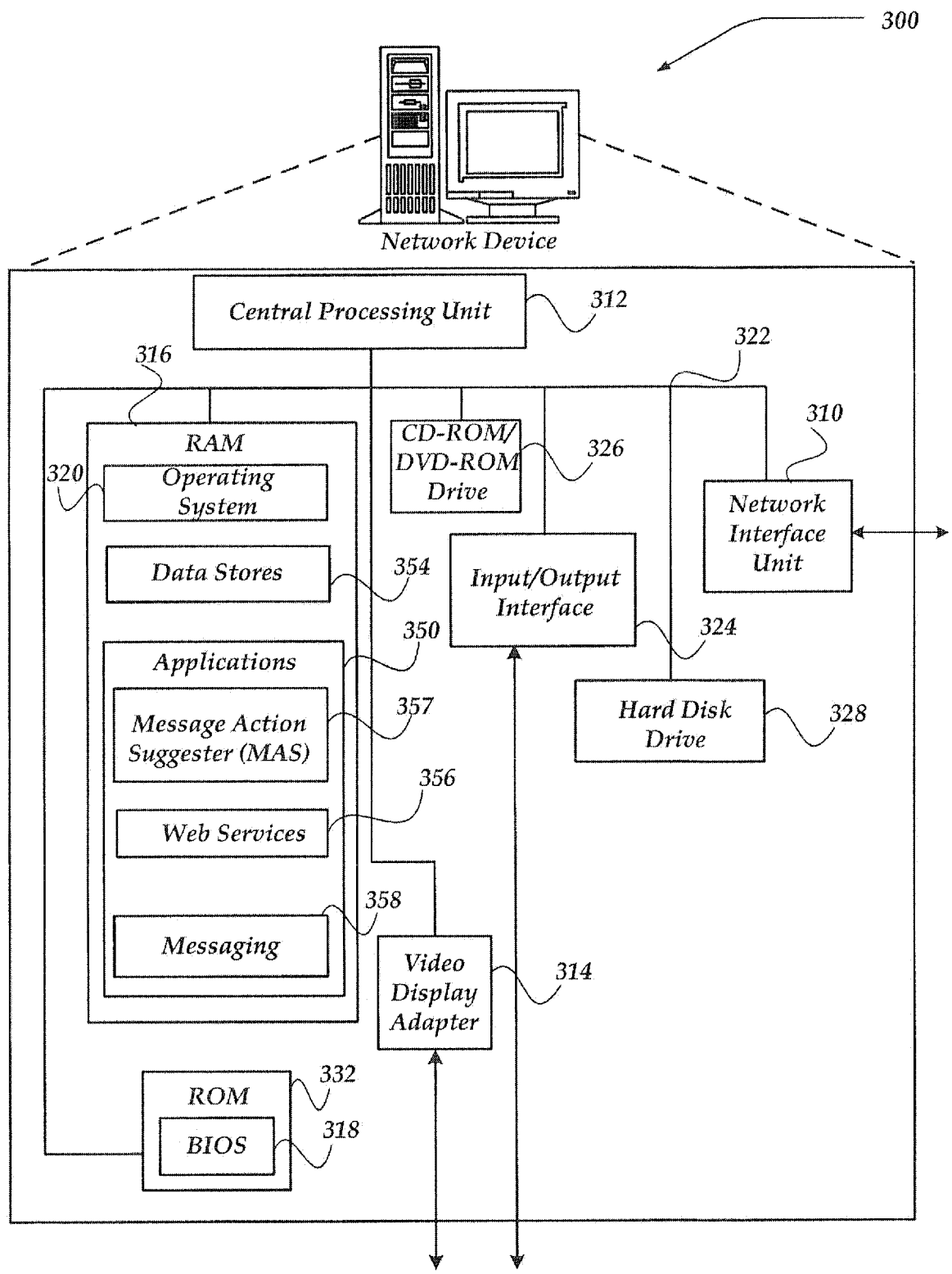
FIG. 3 shows one embodiment of a network device that may be included in a system implementing the invention.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may represent, for example, MAT Services 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of computer-readable media, namely computer-readable storage media. Computer-readable storage media computer-readable may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 354 may include a database, text, spreadsheet, folder, file, or the like, that may be configured to maintain and store user account identifiers, user profiles, email addresses, IM addresses, and/or other network addresses; or the like. Data stores 354 may also store various authoritative scores, citation models, and the like. Data stores 354 may further include program code, data, algorithms, and the like, for use by a processor, such as central processing unit (CPU) 312 to execute and perform actions. In one embodiment, at least some of data and/or instructions stored in data stores 354 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 356, messaging server 358, and Message Action Suggester (MAS) 357, may also be included as application programs within applications 350. MAS 357 may also be stored as computer-executable instructions in a computer-readable storage device such as those described above, such that when the computer-readable storage device is installed into a computing device, such as network device 300, or the like, CPU 312 may then execute the computer-executable instructions to perform various actions including those disclosed herein for MAS 357.

MAS 357 is configured to monitor a plurality of user actions upon a set of messages to automatically learn user behavioral patterns when the users are interacting with the messages. MAS 357 may train one or more machine learning classifiers on the set of messages to learn the users' behavioral patterns. Based on the learned patterns, MAS 357 may suggest one or more actions that a user might take in response to receiving subsequent messages. The suggested actions may include any of a variety of actions that a user might take upon a received message, including, but not limited to reading the message, replying to the message, forwarding the message, deleting the message, archiving the message, such as moving the message to a special folder, or even indicating that no action is suggested to be taken for the message. Other actions may also be suggested, thus, the above examples are not to be construed as exhaustive or otherwise limiting. Moreover, MAS 357 may provide a plurality of suggested actions to be taken upon a given message.

As noted, MAS 357 may train a plurality of classifiers, including, for example, a horizontal classifier based on a plurality of message users. Such horizontal classifier is directed towards predicting how users might behave in general. The horizontal classifier might be configured to determine a variety of actions. Non-exhaustive, non-limiting example include, how do users generally reply to subjects containing 'jokes'; do users generally read messages from users they have sent many messages to in the past; do users generally reply to messages from a particular domain; do users generally reply to messages sent by others with the same last name as the user; or even do users generally forward messages sent by others for whom the user has a fax number, phone number, or other information about the other user in their address book or the like? These are clearly merely possible question sets associated with horizontal classifications.

Another classifier may include a vertical general classifier that is directed towards looking at a particular message recipient, while a third vertical pair-wise classifier might examine particular recipient sender pairs. Vertical general classifiers might include examining such non-limiting, non-exhaustive questions such as: does this user generally reply to subjecting containing a particular word, such as 'fun';

does this user generally read messages from users the user has sent many message to in the past; does this user generally read messages received where the user is on a Cc list; does this user generally reply to messages sent by a particular gender; or even does this user generally read messages by close friends, such as those identified as such in their address book, or any of a variety of other questions.

Similarly, vertical pair-wise classifiers might include examining such non-limiting, non-exhaustive questions such as: does this user generally read messages from a particular user; or even does this user reply to subject 'jokes' sent by a particular user; or the like. Clearly, the above are merely examples. Moreover, labels such as 'family,' 'close friend,' or the like are merely illustrative and are not intended to narrow the scope of an embodiment. Further, such classifiers may find groupings based on a variety of other meanings, questions, or the like.

In any event, MAS 357 may further obtain from a plurality of messages a set of training feature vectors that may include a set of labels indicating an action, such as "was read," "was replied to," and similar action related labels. MAS 357 may then employ the training feature vectors to train the one or more classifiers to be directed towards mapping new, unseen feature vectors to one or more action labels. MAS 357 may employ a variety of features, including, but not limited to those described above to generate feature vectors.

MAS 357 may then employ a combination of one or more classifiers to generate a predicted action that a particular user might take for a given received message. In one embodiment MAS 357 may further obtain from the one or more classifiers a value that indicates a confidence level of the classifier in its prediction. Such confidence levels may then be combined to provide a ranking for a message for a predicted action. In one embodiment, the ranking may be used to rank order the messages within a predicted action, the predicted action being displayed with the message, as a suggested action that the user might take on a given message. Moreover, the confidence levels, a number of messages in a given action, or a variety of other metrics may be used to rank order actions across the messages, and/or even rank order a plurality of actions for a given message. In any event, MAS 357 may display results of the rank ordered messages and/or actions within a display for a client device, using for example, a screen display such as described below in conjunction with FIG. 5. Further MAS 357 may employ a process such as disclosed below in conjunction with FIG. 4 to perform at least some of its actions.

Web services 356 represent any of a variety of services that are configured to provide content, including messages, over a network to another computing device. Thus, web services 356 include for example, a web server, a File Transfer Protocol (FTP) server, a database server, a content server, or the like. Web services 356 may provide the content including messages over the network using any of a variety of formats, including, but not limited to WAP, HDML, WML, SGML, HTML, XML, compact HTML (cHTML), extensible (xHTML), or the like.

In one embodiment, Web services 356 may receive content, including messages from another network device, such as a client device, or the like. Web services 356 may then enable a user to manage a user message account. As such, web services 356 may allow users to compose messages, delete messages, move messages to folders, create folders, or the like.

In one embodiment, Web services 356 (and/or messaging 358) may interact with MAS 357 to automatically display suggested actions that a user might take upon a message. In one embodiment, messages may be rank ordered within a given action to indicate a priority for taking the suggested action on a message. In one embodiment, selecting an icon next to the message that indicates the suggested action may initiate the suggested action. Thus, for example, in one embodiment, selecting an icon next to a message where the icon indicates that the message is to be 'forwarded' might result in the message being configured in a display screen at a client device ready to be forwarded. In one embodiment, a suggested list of recipients might also be provided to the user. The user may then edit the suggested list of recipients by adding and/or deleting one or more recipients in the list. In addition, the message may be further configured with an appropriate section added within the body ready for additional information to be entered by the user. However, in other embodiments, other portions of the message might be modified, including, pre-inserting the user's signature block, and/or other edits to the received message might also be suggested.

Generalized Operation

The operation of certain aspects of the invention will now be described with respect to FIG. 4. The operations described below for FIG. 4 may, in one embodiment, be performed within one or more network devices, such as MAT Services 107 of FIG. 1.

Figure 4:
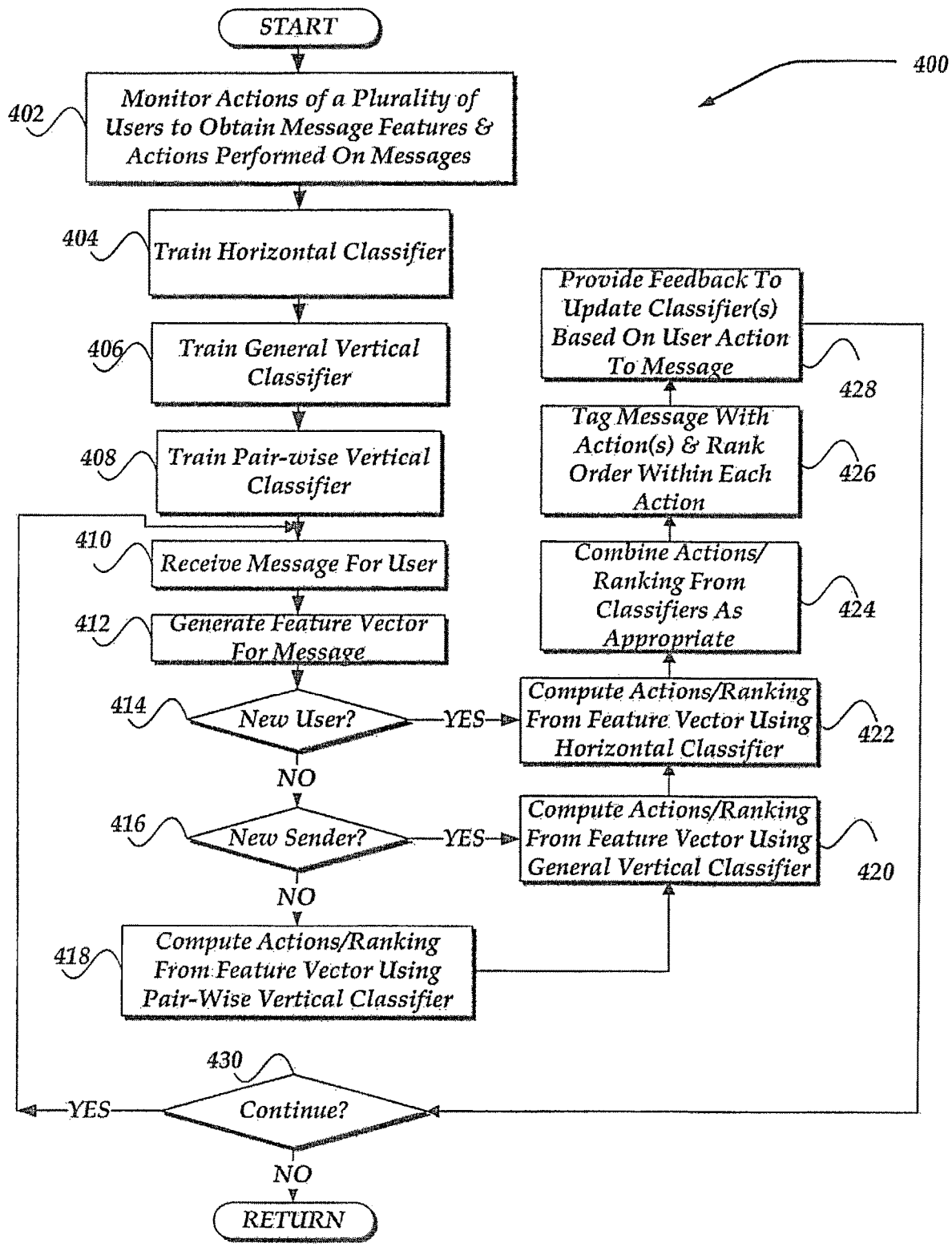
FIG. 4 illustrates a logical flow generally showing one embodiment of an overview process for use in determining one or more suggested actions a user might take on a message.

Process 400 of FIG. 4 begins after a start block, at block 402, where actions of a plurality of users are monitored over a plurality of messages to generate an initial training set of feature vectors and actions performed by the users on the messages. In one embodiment, this training set of feature vectors and labels of actions taken may be obtained using any of a variety of mechanisms.

Processing then flows to block 404 where a horizontal classifier is trained using the feature vectors and associated actions. Moving to blocks 406 and 408 vertical classifiers are also trained for each of a plurality of users, to generate classifiers that are specific to a given user (vertical general classifier) and to a given user-sender pair (vertical pair-wise classifier).

Continuing next to block 410, the trained classifiers may then be employed to predict actions that a given user might take for a given message. Therefore, at block 410, a message is received for a user. Moving to block 412, a feature vector is generated for the received message, based on the discussions above.

Flowing next to decision block 414, a determination is made whether the user is determined to be a new user. That is, in one embodiment, a determination is made as to whether a history of actions have been monitored and employed to train vertical classifiers for this user. If the user is not new, then processing branches to decision block 416; otherwise, processing branches to block 422.

At decision block 416, a determination is made whether the sender of the message is new to the user. That is, has this user received and acted upon messages from this sender in the past, such that a vertical classifier has been trained based on this sender-user pair? If this sender is not new to this user, processing flows to block 418; otherwise, processing continues to block 420.

At block 418, the vertical pair-wise classifier for this sender-user pair is employed to predict an action that this user is likely to take on this message given previous information about actions this user has taken given this message sender. In one embodiment, the classifier may also generate a confidence level indicating a level of confidence that the classifier provides for its predicted action. In one embodiment, a plurality of actions may be predicted. Processing continues next to block 420.

At block 420, the vertical general classifier for this user is employed to predict an action that this user is likely to take on this message based on previous information about actions this user has generally taken on messages having similar feature vectors. In one embodiment, the classifier may also generate a confidence level indicating a level of confidence that the classifier provides for its predicted action. In one embodiment, a plurality of actions may be predicted. Processing continues next to block 422.

At block 422, the horizontal general classifier is employed to predict an action that is likely to be taken on this message based on previous information about actions generally taken on messages having similar feature vectors by a plurality of users. In one embodiment, the classifier may also generate a confidence level indicating a level of confidence that the classifier provides for its predicted action. In one embodiment, a plurality of actions may be predicted. Processing continues next to block 424.

At block 424, the predictions from one or more of the classifiers may be combined. In one embodiment, a weighted average of the predictions may be used to generate the predicted action(s). In one embodiment, weighting coefficients for the combining of the predictions may be based on a size of a user's history. Thus, for example, where there is determined to be a statistically significant sample size of actions for the user-sender pair, results from the vertical pair-wise classifier might be weighted higher than the predictions from the other classifiers. In another embodiment, where each at least one classifier predicts a statistically significant action that is different from an action predicted by the other classifiers, each action determined to be statistically significant may be retained for display. Statistically significant results may be based on a variety of statistical analysis criteria, including, sample size, desired levels for Type I errors, Type II errors, and the like. Thus, statistically significant values may be determined based on engineering judgment, desired confidence levels above a threshold, and the like. In any event, one or more predicted actions may be determined for a given message, along with associated confidence levels for each of the predicted actions.

Processing then flows to block 426, where the message is tagged or otherwise labeled or identified with its predicted action(s). In one embodiment, for a given predicted action, messages, including the message, may be rank ordered for display. In one embodiment, the messages may be rank ordered based on the confidence level determined for the message for the given action. Where a message has multiple predicted actions, these actions may be ordered for that message based on confidence levels. It should be noted that while confidence levels from the classifiers are disclosed as being used to rank order actions, and/or messages within an action, other metrics may also be employed in other embodiments. Further, at block 426, the message(s) along with predicted actions are displayed to the user, where such predicted actions are provided as suggested actions that the user is suggested to take on a given message.

Processing next flows to block 428, where the user may take any of a plurality of actions, including, but not limited to the suggested actions. Further, as described elsewhere, selection of various displayed action icons enables the user to readily perform the suggested action, including, in at least one embodiment, taking suggested actions that are directed towards preserving a conversation associated with a message, message thread, or the like. Actions actually taken by the user on the message, and/or other messages are monitored, and may then be useable to retrain one or more of the classifiers. Thus, although not explicitly illustrated, it should be understood that blocks 402, 404, 406, and 408 may be performed virtually anytime based on feedback from one or more users, monitored actions of the users, and the like. In this manner, a size of history of a given user may be modified.

Processing then flows decision block 430, where a determination is made whether to continue to receive messages for a given user, and to predict one or more actions to suggest that the user take on the received messages. If so, processing may loop back to block 410 or 402 for retraining, Otherwise, process 400 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

Illustrative Display

Figure 5:
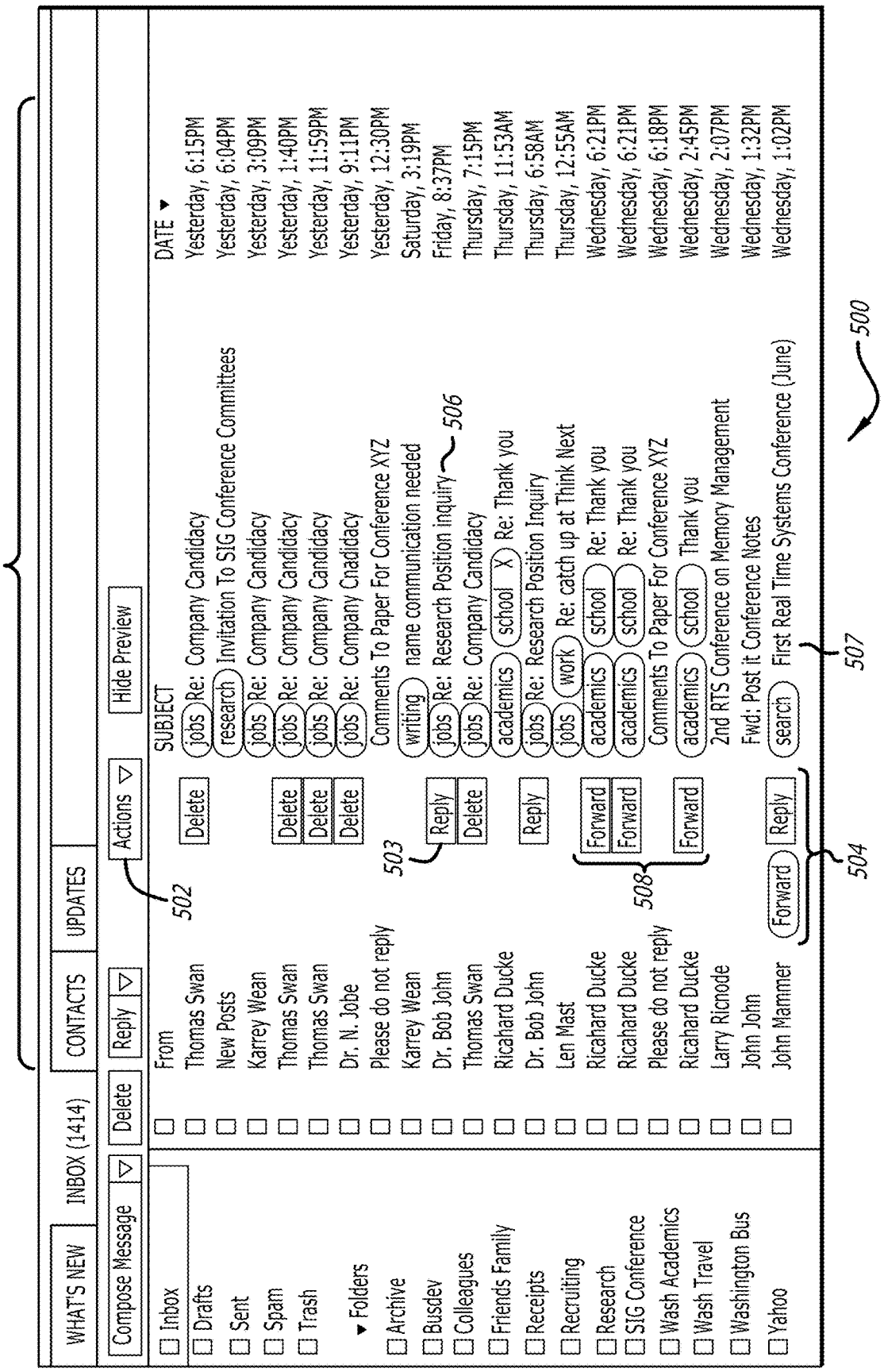
FIG. 5 illustrates one embodiment of a messaging screen display showing possible, non-exhaustive examples of one or more actions suggested that a user can take on a message.

FIG. 5 illustrates one embodiment of a messaging screen display showing possible, non-exhaustive examples of one or more actions suggested that a user can take on a message. Screen 500 may be managed using processes such as described above for display at a client device, such as client devices 101-105 of FIG. 1. Not all the components illustrated in screen 500 may be required to practice various embodiments, and variations in the arrangement and type of the components may be made. As shown, screen 500 of FIG. 5 includes a plurality of messages 501. Such plurality of messages 501 may be displayed with a variety of information associated with the message; however, such information is not to be construed as limiting, and other information about the messages may also be displayed. Thus, as shown, for the plurality of messages 501, are subject information, tags, dates, and from (sender information). Also illustrated for the plurality of messages 501 are one or more actions 502 for each of the plurality of messages 501. For example, as illustrated for message 506, a suggested action 503 indicates that the user might 'reply' to message 506, while action 508 provides the user with the suggested action to "forward" a subset of the plurality of messages 501. In one embodiment, the subset of plurality of messages 501 associated with the action 508 may be rank ordered for the given action 508. While a rank order value is not displayed in screen 500, in other embodiments, such values may be displayed. Thus, screen 500 is not construed as limiting other embodiments. Further, as illustrated, message 507 shows that messages may have a plurality of actions 504. Again, in one embodiment, the plurality of actions 504 may be rank ordered for the message 507, and then displayed in such rank ordering for message 507. Similarly, the rank ordered actions 504 may be included in rank ordering message 507 along with similar actions, such as action 508. In one embodiment, selection of actions 502 icon may enable the user to selectively display subsets of actions. Thus, in one embodiment, the actions 502 icon may enable the user to display messages having the action to 'reply,' while hiding messages having the action to 'forward,' or the like. Similarly, selection of a particular message's icon, such as action 503 icon, automatically opens the associated message 506 in a configuration ready for the user to reply to the message, including providing appropriate recipients, signature blocks, or the like. Moreover, selection of a particular displayed action and selection of a related icon may enable the user to take a global action over the subset of labeled messages. Thus, selection of a forward action 502 might enable each of messages associated with the action 508 to forward, might configure each of the messages ready for forwarding. In one embodiment, a candidate set of recipients for the forwarded messages may be automatically provided to the user based on historical actions by the user, as further determined by one or more classifiers, or the like.

As noted above, predicting how a user might respond to a given message provides an opportunity to advertisers, and/or other entities to be able to improve and focus messages to those users that are more likely to act upon those messages. Thus, predicting, for example, that a user is likely to place orders, and/or otherwise reply to a particular type of message, such as an advertisement, an educational bulletin, medical brochure, or the like, provides for more directed mailings. Similarly, predicting which users are more likely to forward messages, acting like gossipers, sneezers, or the like, provides for more directed and efficient mailings.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
   receiving, at a computing device, prior to a message being sent to an intended recipient, the message composed via a user interface of a messaging application, the message identifying the intended recipient and comprising content;
   analyzing the message, via the computing device, prior to the message being sent to an intended recipient, and based on the analysis determining a feature vector, the feature vector representing the message;
   applying, via the computing device, a classifier to the message using the feature vector;
   determining, via the computing device, a set of likely actions of the intended recipient, each action in the set of likely actions being a predicted action the classifier identifies as a future action the intended recipient is likely to take on the message; and
   using, via the computing device, the set of likely actions of the intended recipient of the message to make a determination whether to send the message to the recipient.

2. The method of claim 1, further comprising:
   sending, via the computing device, the message to the recipient based on the determination.

3. The method of claim 2, further comprising:
   updating, via the computing device, the classifier using information indicating that the message was sent to the recipient.

4. The method of claim 1, the information identifying the set of likely actions of the intended recipient of the message comprising an action of forwarding the message.

5. The method of claim 1, the message identifies multiple intended recipients, the set of likely actions of the intended recipient being determined for each of the multiple intended recipients, and the determination is made for each of the multiple recipients.

6. The method of claim 5, further comprising:
   sending the message to a subset of the multiple intended recipients of the message based on the determination made for each recipient of the subset of recipients.

7. The method of claim 2, further comprising:
   updating, via the computing device, the classifier using information indicating an action taken by the intended recipient to the message.

8. The method of claim 1, the classifier takes into account activities the intended recipient has taken on other messages.

9. The method of claim 1, the classifier is directed towards predicting how users might behave in general to the message.

10. The method of claim 1, further comprising:
    using, via the computing device, the feature vector and the classifier to determine a ranking for each action in the set of likely actions.

11. A non-transitory computer-readable storage medium tangibly encoded with computer-executable instructions that when executed by a processor associated with a computing device perform a method comprising:
    receiving, prior to a message being sent to an intended recipient, the message composed via a user interface of a messaging application, the message identifying the intended recipient and comprising content;
    analyzing the message prior to the message being sent to an intended recipient, and based on the analysis determining a feature vector, the feature vector representing the message;
    applying a classifier to the message using the feature vector;
    determining a set of likely actions of the intended recipient, each action in the set of likely actions being a predicted action the classifier identifies as a future action the intended recipient is likely to take on the message; and
    using the set of likely actions of the intended recipient of the message to make a determination whether to send the message to the recipient.

12. The non-transitory computer-readable storage medium of claim 11, the method further comprising:

sending the message to the recipient based on the determination.

13. The non-transitory computer-readable storage medium of claim 11, the classifier takes into account activities the intended recipient has taken on other messages.

14. The non-transitory computer-readable storage medium of claim 11, the classifier is directed towards predicting how users might behave in general to the message.

15. The non-transitory computer-readable storage medium of claim 11, the method further comprising:
using the feature vector and the classifier to determine a ranking for each action in the set of likely actions.

16. A computing device comprising:
a processor; and
a non-transitory storage medium for tangibly storing thereon program logic for execution by the processor, the program logic comprising:
receiving logic executed by the processor for receiving, prior to a message being sent to an intended recipient, the message composed via a user interface of a messaging application prior to the message being sent by a sender, the message identifying the intended recipient and comprising content;
analyzing logic executed by the processor for analyzing the message prior to the message being sent to an intended recipient, and based on the analysis determining a feature vector, the feature vector representing the message;
applying logic executed by the processor for applying a classifier to the message using the feature vector;
determining logic executed by the processor for determining a set of likely actions of the intended recipient, each action in the set of likely actions being a predicted action the classifier identifies as a future action the intended recipient is likely to take on the message; and
using logic executed by the processor for using the set of likely actions of the intended recipient of the message to make a determination whether to send the message to the recipient.

* * * * *